United States Patent [19]

Antos

[11] 4,173,838
[45] Nov. 13, 1979

[54] COMPACT REPEATING SLIDE VIEWER

[76] Inventor: Joseph Antos, Rte. 1, Box 33, Big Rock, Ill. 60511

[21] Appl. No.: 901,214

[22] Filed: Apr. 28, 1978

[51] Int. Cl.² .............................................. G02B 27/02
[52] U.S. Cl. ......................................... 40/366; 40/513
[58] Field of Search ................. 40/367, 365, 366, 511, 40/513, 361, 363, 362, 512

[56] References Cited

U.S. PATENT DOCUMENTS

| | | | |
|---|---|---|---|
| 2,419,339 | 4/1947 | Dennis | 40/367 |
| 2,426,888 | 9/1947 | Langberg | 40/365 |
| 2,617,218 | 11/1952 | Antos | 40/365 |
| 2,849,814 | 9/1958 | Rideout | 40/367 |
| 2,858,628 | 11/1958 | Rideout | 40/366 |
| 3,783,540 | 1/1974 | Barclay | 40/511 |
| 3,869,819 | 3/1975 | Weggeland | 40/367 |
| 4,057,920 | 11/1977 | Weggeland | 40/513 |

Primary Examiner—Russell R. Kinsey
Assistant Examiner—Wenceslao J. Contreras
Attorney, Agent, or Firm—Leydig, Voit, Osann, Mayer & Holt, Ltd.

[57] ABSTRACT

An improved compact repeating slide viewer of the type having two compartments, one for storing a stack of slides and the other for viewing individual slides, a longitudinally shiftable slide carriage feeds the topmost slide of a stack to the viewing compartment and then returns the viewed slide to the bottom of the stack with the slide carriage retracting a spring actuated tongue which acts upon the stack until the viewed slide is returned to the bottom of the stack and then releases the tongue to elevate the stack for feeding of the next topmost slide. The viewer also includes means for easily loading and unloading slides from the stack or from the viewing compartment, and is constructed to be easily manufactured from molded plastic parts.

8 Claims, 11 Drawing Figures

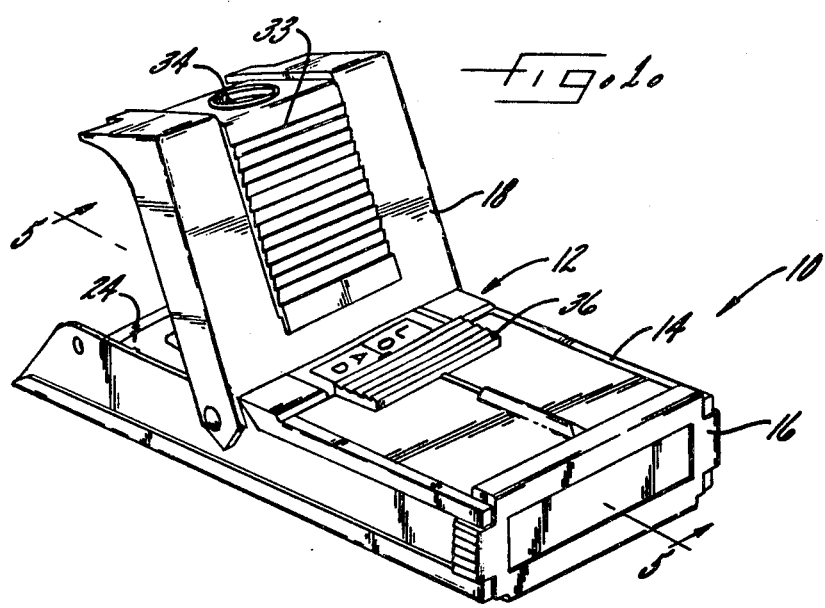
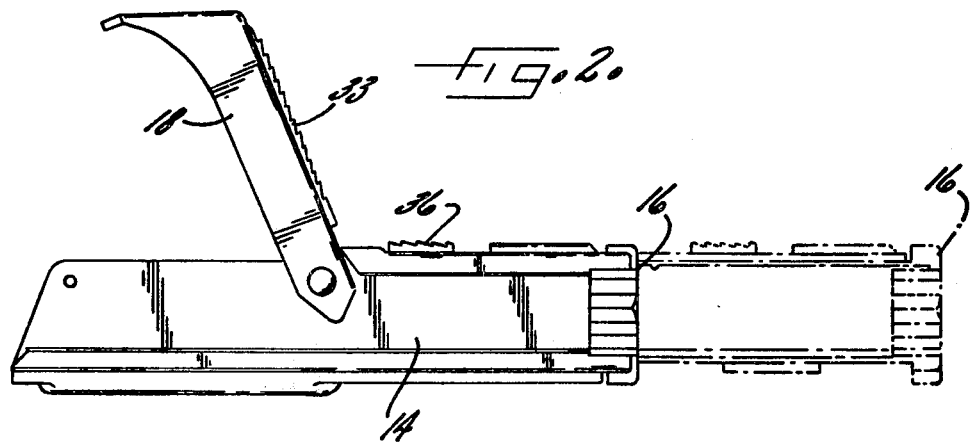
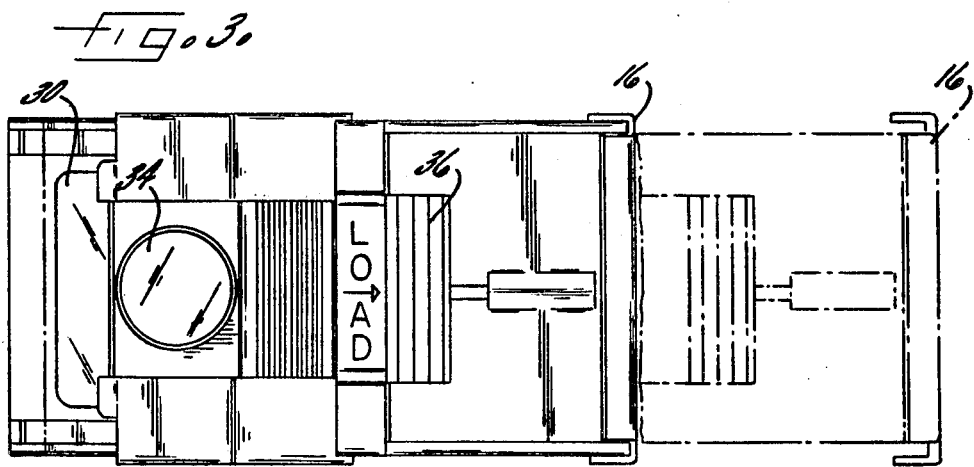

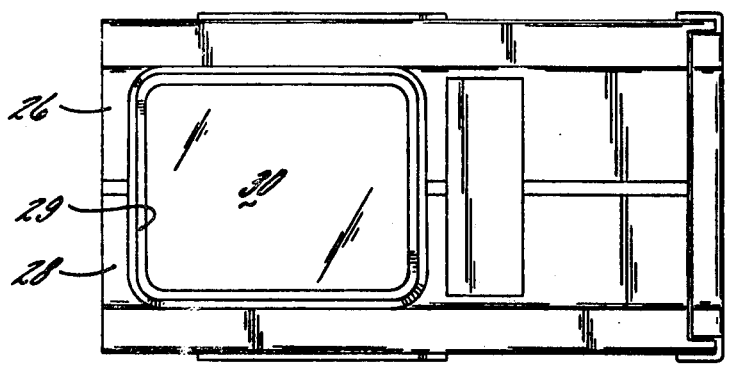
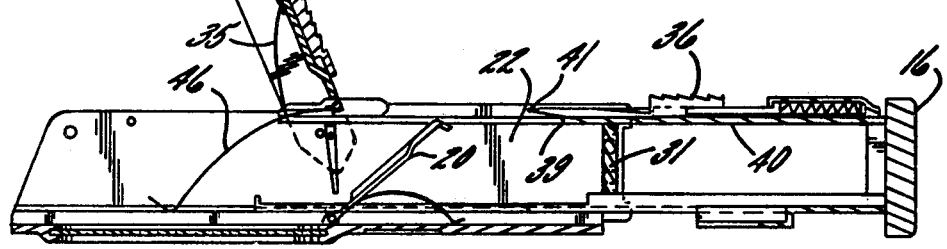
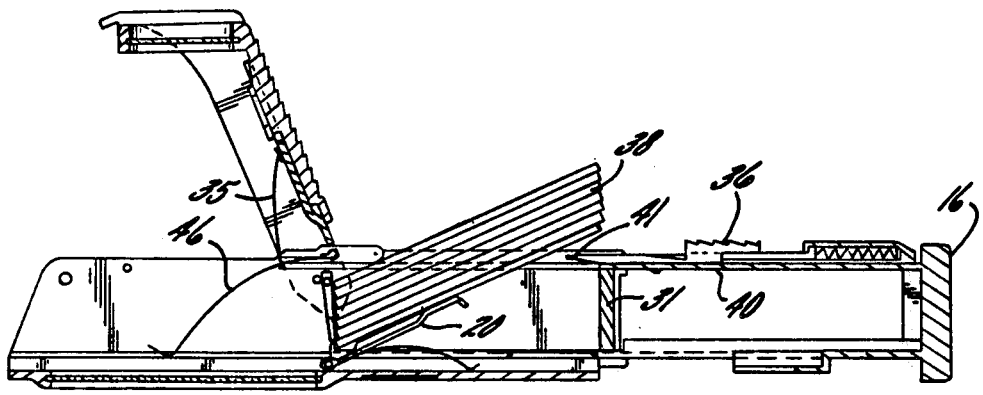

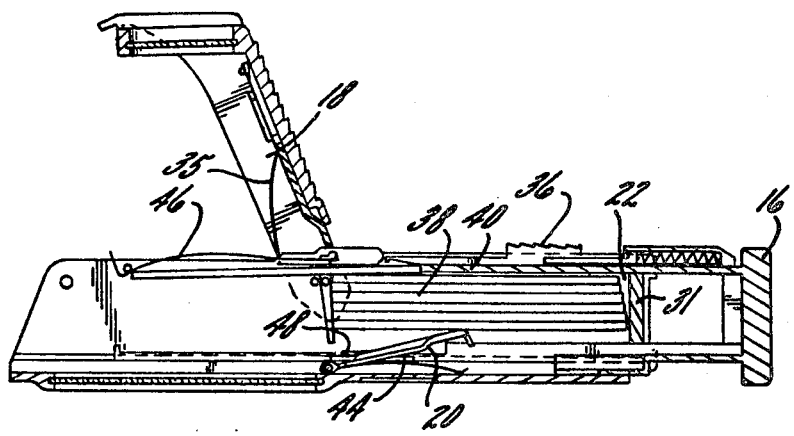
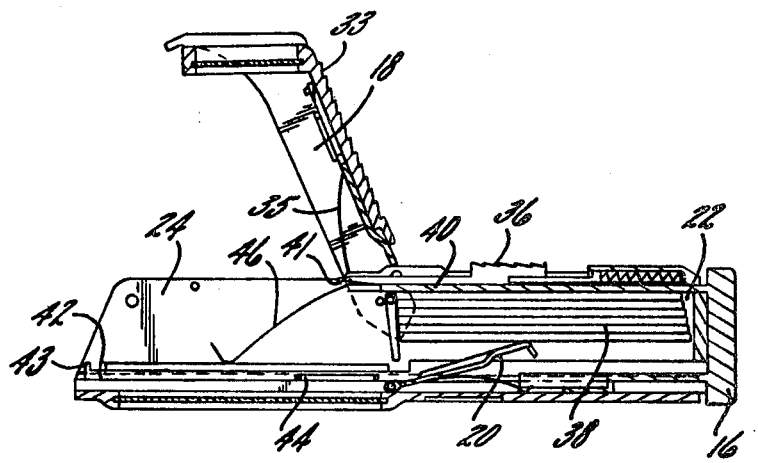
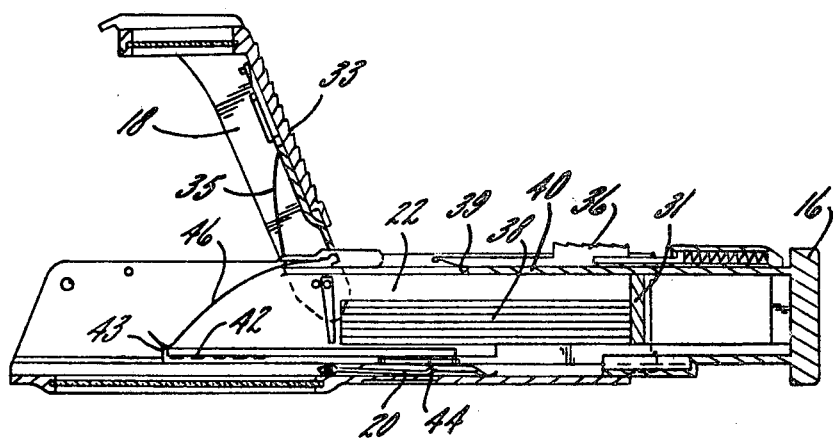

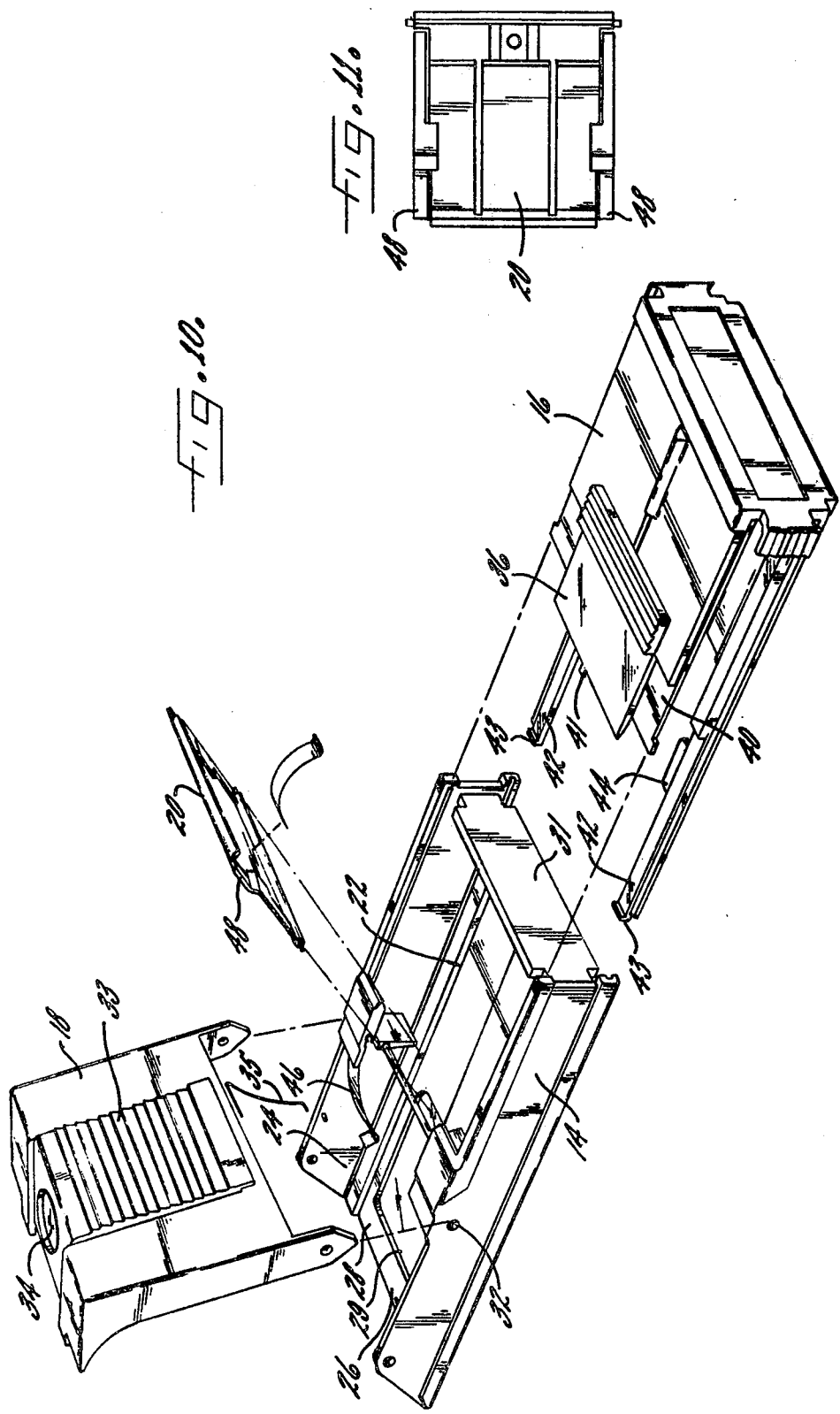

COMPACT REPEATING SLIDE VIEWER

DESCRIPTION OF THE INVENTION

The present invention relates generally to a compact repeating slide viewer and, more particularly, to an improved slide viewer of the type that had been disclosed and claimed in my U.S. Pat. No. 2,617,218 issued Nov. 11, 1952 on Slide Viewer having two compartments, one for storing and the other for viewing slides.

In my previous slide viewer according to the aforementioned patent, there had been provided a relatively simple and compact device which stored a plurality of framed transparencies commonly known as slides in a first compartment of the device and a movable slide carrier sequentially transferred individual ones of the slides from the storage compartment to a viewing compartment and back again so that each of the slides could be viewed in a repetitive manner. While the foregoing slide viewer had been commercialized and did provide a unique and handy device for storing and viewing slides as contrasted to traditional types of portable slide viewers that merely handle one manually manipulated slide at a time, there were certain problems that did arise with my prior device.

One such problem was that the stored slides in the compartment were held under constant compression by the slide lifting spring and the slide transferred from the viewing compartment back into the stored group was shifted to the bottom of the pack under the compression of the spring. This would lead to damaging the slide frames especially where the slides were transferred around through many cycles in the viewer such as where the device may be used for sales presentations and the like.

Another problem arose with respect to the relative ease of loading and unloading a group of slides in the storage compartment when for example the device was handled by less sophisticated users. Another area where some difficulty had been encountered was in connection with the manipulation of the slide carriage to transfer a new slide into the viewing compartment when the user hesitated before completing the transfer of a slide and return the carriage to its rearward position which could result in some jamming since the stack was urged upwardly to bring the next slide in readiness for transfer.

Accordingly, it is a principal object of the present invention to provide an improved compact slide viewer which is capable of storing a stack of slides and can automatically transfer individual slides from the stack to a viewing compartment and then back again into the stack sequentially but which avoids movement of a slide from the viewing compartment back into a stack that is under compression for avoiding damage to slide frames repeatedly cycled in the viewer.

It is another object of the invention to provide such an improved compact slide viewer which avoids the possibility of jamming if the slide carriage is moved only partially inward and returned to the extended position.

A further object of the invention is to provide an improved compact slide viewer for storing and viewing a stack of slides which is easy to load.

Still another object of the invention is to provide such an improved compact slide device which is simple and economical to manufacture yet has a fairly rugged construction that gives a long operating life.

Other objects and advantages of the invention will be apparent from the following detailed description and the accompanying drawings, in which:

FIG. 1 is a view in perspective of a slide viewer embodying the present invention, here shown with its viewer lid in the upright viewing position;

FIG. 2 is a side elevation view of the slide viewer of FIG. 1;

FIG. 3 is a top view here showing the slide carriage extended;

FIG. 4 is a bottom view of FIG. 3;

FIG. 5 is a cross section through 5—5 of FIG. 1 showing the slide compartment loaded with slides, one slide in the viewing compartment, the viewer lid open for viewing the slide in the viewing compartment;

FIG. 6 is a cross sectional view of the viewer of FIG. 1 showing the manner in which a stack of slides is loaded;

FIG. 7 is a cross section similar to FIG. 5 here showing the slide carriage partially moved inwardly for transferring a first slide to the viewing compartment;

FIG. 8 is a cross section view similar to FIG. 7 here showing the slide carriage all the way in with the first slide being in the viewing compartment;

FIG. 9 is a cross section view similar to FIG. 8 here showing the slide carriage partially extended outward and returning the slide from the viewing compartment to the bottom of the stack;

FIG. 10 is an exploded view of the components of the slide viewer; and

FIG. 11 is a top plan view of the depressable tongue.

While the invention will be described in connection with a certain preferred embodiment, it will be understood that it is not intended to limit the invention to this particular embodiment. On the contrary, it is intended to cover all alternatives, modifications and equivalents as may be included within the spirit and scope of the invention as defined by the appended claims. Moreover, there is disclosed and claimed in my copending application Ser. No. 856,293 filed Dec. 1, 1977 an ornamental design for the slide viewer.

Turning now to the drawings and referring first to FIGS. 1 and 2, there is shown a compact slide viewer in accordance with the present invention, generally indicated by 12 with its main components that make up the substantially rectangular shaped viewer being a body portion 14 having bottom, sides and back walls, a U-shaped slide carriage 16 and a viewer lid 18. A spring actuated and depressable tongue member 20 is pivotally mounted intermediate the ends of the viewer and projects into a slide storage compartment 22. The viewer lid which is hingedly mounted to the body side walls pivots upwardly providing access to the open front end adjacent the viewing compartment 24 which as will be more fully explained herein enables removal or supplementation of one slide in the viewing compartment without disturbing the rest of the slides of a stack contained in the storage compartment.

The arrangement of the present slide viewer is such that it may be easily fabricated and assembled from molded plastic parts. Indeed, in the present instance, the body 14 is formed of a pair of interfitting substantially L-shaped components 26, 28 that when assembled together define the rectangular opening 29 which receives a light diffusing window 30 that may be made of plastic or other suitable material. An end wall 31 staked and/or adhesively secured to the side walls of the body provides additional rigidity to the structure. Also, the viewer lid which fits over the side walls of the body and has hinge pins 32 secured to the side walls adds to the rigidity.

The viewer lid incorporates a longitudinally shiftable lens support member 33 which carries a magnifying lens 34 and due to this shifting permits some degree of focus adjustment to be obtained with respect to the slide in the viewing compartment.

The viewer lid is also provided with a lever type spring 35 which upon lifting of the lid part way will urge the lid into the fully open position and hold it there for viewing, but upon closing of the lid approximately beyond the half way point then urges the lid 18 closed and holds it in the closed position.

In keeping with the operation of the present invention, the slide carriage 16 which is received within the body 14 is longitudinally shiftable between an inward closed position and an outward fully extended position as illustrated, in FIG. 2.

When the slide carriage is fully extended outward the slide storage compartment is substantially open at the top, but a slidable load member 36 carried by the carriage extends inwardly over the compartment opening. When the slidable member 36 is moved rearwardly, the opening of the slide storage compartment is fully accessible and a stack of slides 38 may be inserted into the compartment. Upon inserting the stack of slides as viewed in FIG. 6 and pushing the stack downwardly to depress the tongue the stack fits into the compartment and upon release of the slidable load member 36 the stack is held in the compartment. The forward edge 39 of the upper wall 40 of the slide carriage engages the end of the uppermost slide as shown in FIG. 9, and when the slide carriage is now moved inwardly toward the viewer compartment, the uppermost slide is moved forwardly in the same direction.

In keeping with one of the aspects of the present invention, the forward edge 39 of the slide member wall 40 is provided with a downwardly extending tang 41 arranged to engage with an inner border edge of a slide frame as the uppermost slide is being urged forwardly toward the viewing compartment. The arrangement is such that if the slide carriage is not moved all the way inwardly or for some reason there is a hesitation and movement is commenced but reversed, the uppermost slide is pulled back into the stack. This prevents a next slide from moving into position against the feeding edge 39 of the slide carriage which would result in jamming when two slides would be then sought to be urged forwardly.

Referring to FIG. 10, it can be seen that the lower portion of the slide carriage includes a pair of spaced forwardly extending fingers 42 having upwardly turned hooks 43 at their ends. In addition, a pair of inwardly directed tangs 44 are located on the fingers 42 rearwardly from the hook ends. These tangs, in accordance with the present invention and as best viewed in FIG. 10, pass over the outside edges of the tongue 20 as the slide carriage is retracted thereby moving the tongue down to release the spring pressure on the stack of slides until the slide from the viewing compartment is replaced beneath the stack. When the slide carriage is retracted fully outwardly, the tangs release the tongue which under the action of spring 45 moves the stack upwardly bringing the topmost slide back in position for engagement by the leading edge 39 of the slide carriage.

At this point when the slide carriage is moved forwardly pushing the uppermost slide toward the viewing compartment, the slide moves into engagement with a pair of spaced downwardly curved springs 46 which guide the slide down toward the slide carriage fingers and finally press and hold the slide flatly against the fingers for viewing.

As previously indicated, with a slide in the viewing compartment there is accessibility through the open end thereof to remove the slide manually and replace it with another slide if so desired.

To change slides automatically, the side walls of the body portion are held in one hand while the bent over lips 48 on opposite sides of the slide carriage may be grasped between the thumb and forefinger of the other hand and the carriage is pulled outwardly from the body. The upturned hooks 43 of the carriage fingers pull the slide in the viewing compartment rearwardly directing the slide toward the bottom of the stack. As the slide carriage is moved outwardly the inwardly directed tangs on the fingers ride over the tongue moving it downwardly to release the spring pressure on the stack as the slide from the viewing compartment becomes positioned beneath the stack. When the tangs have completely cleared the tongue which occurs when the slide has been returned beneath the stack and the tongue then moves upwardly lifting the stack and repositioning the uppermost one of the stack in readiness for shifting into the viewing compartment with the forward movement of the slide carriage.

Referring to FIG. 11, the depressable tongue member 20 has lips 48 which are resilient and permit the carriage finger tangs 44 to move underneath the lips as shown in FIG. 7 during forward motion of the carriage 16. Yet, the tangs 44 will ride over the lips to depress the tongue 20 when the carriage is moved outward as in FIG. 9.

The continual inward and outward movement of the slide carriage will result in the cycle where the top slide of the stack is brought into the viewing compartment and then returned to the bottom of the stack until all of the slides have been viewed.

In the present arrangement the compact slide viewer dimensions have been so selected as to enable the storage compartment to receive approximately ten slides. However, the device can be scaled upwardly or downwardly if a differing capacity is desired.

I claim as my invention:

1. In a compact slide viewer, the combination comprising, a body portion having bottom and side walls, a slide carriage member longitudinally shiftable from one end of said body, said end of the body receiving the slide carriage defining a slide storage compartment and the opposite end of the body defining a slide viewing compartment having a translucent window therein, viewer lid means carrying a magnifying lens pivotally mounted to said body above the viewing compartment, a spring actuated tongue means disposed in said storage compartment, said slide carriage having an upper wall member defining a feeding edge, a shiftable member extending forwardly over said edge to retain slides in the storage compartment, a lower wall portion on said slide carriage including forwardly extending spaced fingers having upwardly extending hooks at their ends, at least one of said fingers having an inwardly directed tang, said tang causing the tongue to be retracted when the slide carriage is moved to its outwardly extended position and releasing the tongue upon reaching the substantially fully outwardly extended position of the slide carriage so that the stack is elevated to engage the uppermost slide with said feeding edge of the carriage whereupon inward movement of the carriage feeds the uppermost slide into the viewing compartment and outward movement of the carriage returns the viewed slide from the viewing compartment to the underside of the stack of slides in the storage compartment with said tongue being released from the stack while the viewed slide is being returned to the bottom of the stack.

2. A compact slide device as claimed in claim 1 wherein said load member is longitudinally shiftable with respect to the upper wall of the carriage to release the stack of slides which pops up through the top of the storage compartment by the tongue urging the stack upwardly.

3. A compact slide viewing device as claimed in claim 2 wherein the forward end of the load member includes a downwardly projecting tang to engage a slide frame when the uppermost slide is being shifted by said carriage so that if the slide carriage is prematurely returned to the outwardly extended position it brings the uppermost slide back with it.

4. A slide viewing device as claimed in claim 1 wherein said magnifying lens means is slidably mounted to said lid and movable toward and away from the slide in the viewing compartment to adjust the focus with respect to the slide being viewed.

5. A slide viewing device as claimed in claim 1 wherein said viewer lid includes a lever spring which urges said lid and holds it in an open position after the lid has been partially moved toward the open position and when the lid has been moved toward the closed position it urges the lid toward and holds it in the closed position.

6. A slide viewing device as claimed in claim 1 wherein the body is open ended adjacent to the viewing compartment and with the lid open a slide in the viewing compartment may be removed and changed manually.

7. A slide viewing device as claimed in claim 1 wherein said body portion, slide carriage and viewer lid are formed of molded plastic parts.

8. In a compact repeating slide viewer, the combination comprising, a body portion including a storage compartment for storing slides to be viewed and a viewing compartment for viewing slides one at a time with respect to said body, said viewing compartment having a light passing window therein, viewer lid means carrying a magnifying lens pivotally mounted to said body above the viewing compartment, a spring actuated tongue means disposed in said storage compartment, said slide carriage including means operative to move one slide at a time from the top of the storage compartment to the bottom of the viewing compartment and to return said slide after being viewed to the storage compartment, said slide carriage having means for retracting the tongue when the slide carriage is shifted to return a slide from the viewing compartment to the storage compartment and releasing the tongue when the viewed slide is returned to the storage compartment.

* * * * *